United States Patent
Acker et al.

(10) Patent No.: US 10,761,901 B2
(45) Date of Patent: Sep. 1, 2020

(54) DYNAMIC RUNTIME WORKLOAD BALANCING IN A DISTRIBUTED COMPUTING ENVIRONMENT

(71) Applicant: International Business Machines Corporation, Armonk, NY (US)

(72) Inventors: Warren P. Acker, Oronoco, MN (US); David M. Koster, Rochester, MN (US); Jason A. Nikolai, Rochester, MN (US); Schuman Shao, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/021,124

(22) Filed: Jun. 28, 2018

(65) Prior Publication Data

US 2020/0004600 A1   Jan. 2, 2020

(51) Int. Cl.
*G06F 9/46* (2006.01)
*G06F 9/50* (2006.01)
*H04L 29/08* (2006.01)

(52) U.S. Cl.
CPC ............ *G06F 9/5083* (2013.01); *H04L 67/10* (2013.01)

(58) Field of Classification Search
None
See application file for complete search history.

(56) References Cited

U.S. PATENT DOCUMENTS

| | | |
|---|---|---|
| 8,898,402 B1 | 11/2014 | Stronge |
| 9,218,359 B2 | 12/2015 | Larimore et al. |
| 2013/0198371 A1* | 8/2013 | Branson ................ H04L 43/08 709/224 |
| 2014/0164594 A1 | 6/2014 | Crowell et al. |
| 2017/0060465 A1* | 3/2017 | Branson ................ G06F 3/0637 |
| 2017/0153927 A1 | 6/2017 | Cook et al. |
| 2017/0359395 A1 | 12/2017 | Cook et al. |

OTHER PUBLICATIONS

Weihan Wang, Mohamed A. Sharaf, Shimin Guo, and M. Tamer Özsu, "Potential-Driven Load Distribution for Distributed Data Stream Processing," SSPS '08 Proceedings of the 2nd international workshop on Scalable stream processing system, Mar. 2008, pp. 13-22.

(Continued)

*Primary Examiner* — Gregory A Kessler
(74) *Attorney, Agent, or Firm* — Robert Bunker; SVL IP Law

(57) ABSTRACT

A computer system dynamically balances a workload of a distributed computing application at runtime. A distributed computing application is monitored at runtime for the occurrence of one or more conditions, wherein the distributed computing application comprises one or more nodes that include one or more processing elements, and wherein each processing element includes one or more operators. One or more adjustments to the distributed computing application are determined. The one or more adjustments to the distributed computing application are performed at runtime. Embodiments of the present invention further include a method and program product for configuring processing elements within a distributed computing system in substantially the same manner described above.

12 Claims, 5 Drawing Sheets

(56) References Cited

OTHER PUBLICATIONS

Akbar Siami Namin, Mohan Sridharan, and Pulkit Tomar, "Predicting Multi-Core Performance: A Case Study Using Solaris Containers," IWMSE '10 Proceedings of the 3rd International Workshop on Multicore Software Engineering, May 2010, pp. 18-25.

Thomas Heinze, Zbigniew Jerzak, Gregor Hackenbroich, and Christof Fetzer, "Latency-aware Elastic Scaling for Distributed Data Stream Processing Systems," DEBS '14 Proceedings of the 8th ACM International Conference on Distributed Event-Based Systems, May 2014, pp. 13-22.

Merijn Verstraaten and Sven-Bodo Scholz, "On Predicting the Impact of Resource Redistributions in Streaming Applications," ARRAY'14 Proceedings of ACM SIGPLAN International Workshop on Libraries, Languages, and Compilers for Array Programming, 2014, pp. 76-81.

Dimitrije Jankov, Sourav Sikdar, Rohan Mukherjee, Kia Teymourian and Chris Jermaine, "Grand Challenge: Real-time High Performance Anomaly Detection over Data Streams," DEBS '17 Proceedings of the 11th ACM International Conference on Distributed and Event-based Systems, Jun. 2017, pp. 292-297.

\* cited by examiner

DYNAMIC RUNTIME WORKLOAD BALANCING IN A DISTRIBUTED COMPUTING ENVIRONMENT

BACKGROUND

1. Technical Field

Present invention embodiments relate to distributed computing environments, and more specifically, to dynamically balancing an application's workload in a distributed computing environments during runtime.

2. Discussion of the Related Art

A distributed computing environment is a type of computing environment whose components are located across multiple physical computing devices. One particular type of distributed computing environment is a stream computing environment, which is an environment in which a sequence of data processing elements are coupled together to process streaming data in real-time.

When an application is initially deployed to a distributed computing environment, certain assumptions may be taken in an effort to balance the distribution of the application's workload. For example, the components of an application can be distributed across multiple data processing elements in a variety of arrangements, although some arrangements may be superior to others in terms of the amount of computing resources consumed. Given the distributed nature of a computing stream application, it may be difficult to optimize the distribution of an application's workload.

SUMMARY

According to one embodiment of the present invention, a computer system dynamically balances a workload of a distributed computing application at runtime. A distributed computing application is monitored at runtime for the occurrence of one or more conditions, wherein the distributed computing application comprises one or more nodes that include one or more processing elements, and wherein each processing element includes one or more operators. One or more adjustments to the distributed computing application are determined. The one or more adjustments to the distributed computing application are performed at runtime. Embodiments of the present invention further include a method and program product for configuring processing elements within a distributed computing system in substantially the same manner described above.

BRIEF DESCRIPTION OF THE DRAWINGS

Generally, like reference numerals in the various figures are utilized to designate like components.

DETAILED DESCRIPTION

Figure 1:
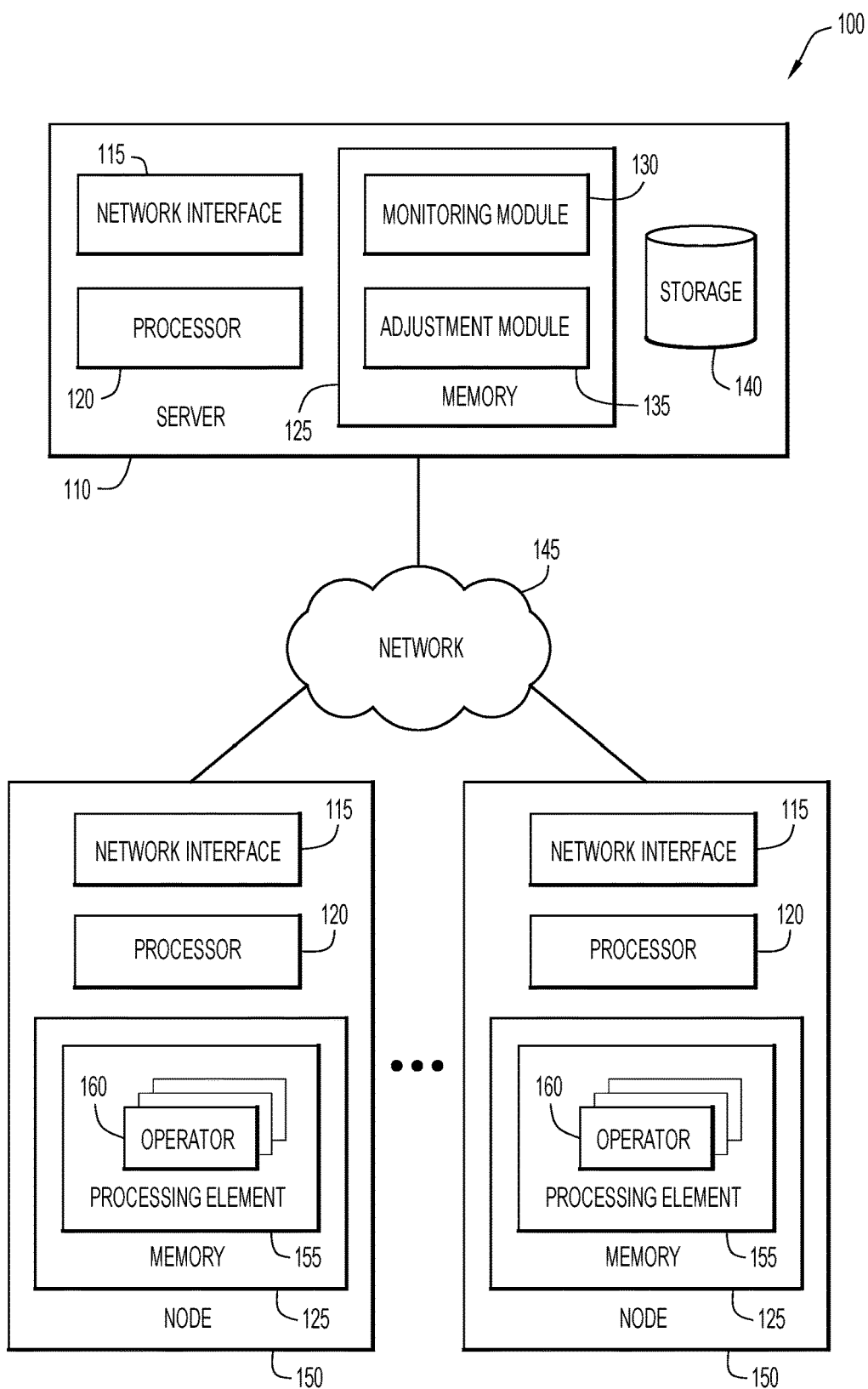
FIG. 1 is a block diagram depicting a computing environment for dynamically balancing an application's workload distribution at runtime in accordance with an embodiment of the present invention.

Present invention embodiments relate to distributed computing environments, and more specifically, to dynamically balancing an application's workload in a distributed computing environments during runtime. A stream computing environment is a type of distributed computing environment in which an application's components, called operators, are hosted by processing elements that are distributed across one or more nodes. A stream computing application typically receives input data in the form of tuples, passes the data through a sequence of operators that each perform some operation on the data, and outputs processed data.

When an application is deployed to a distributed environment, the operators of the application can be distributed across multiple data processing elements in a variety of configurations. When an application is first deployed to a distributed environment, some initial assumptions may be made regarding the distribution of the application's workload. For example, if a particular operator performs a computationally-intense task, then that operator should be provided with a processing element on a node that can provide sufficient computing resources to the component. Similarly, if a particular operator performs a relatively undemanding processing task, but must process a large volume of data, then that operator should be provided with a processing element on a node that has a high-throughput and low-latency network connection.

A resource manager may monitor the performance of an application to determine if the application's workload can be redistributed in order to improve performance or more efficiently utilize available computing resources. However, conventional resource management techniques cannot adjust an application's workload distribution at runtime, but instead must restart the entire application each time an adjustment is performed. Present invention embodiments dynamically balance an application's workload during runtime, which improves the functioning of the distributed system by avoiding unnecessary downtime and by dynamically reacting to changes in an application's demands for computing resources as the changes occur. Thus, an application's workload can be quickly adjusted in order to maintain an optimal configuration while avoiding the tedious process of post-run analysis and re-execution.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for dynamically balancing an application's workload distribution at runtime in accordance with an embodiment of the present invention. As depicted, computing environment 100 includes a server 110, network 145, and nodes 150. It is to be understood that the functional division among components of computing environment 100 have been chosen for purposes of explaining the present invention and is not to be construed as a limiting example.

Nodes 150 are computer systems that together host a distributed computing application, such as a stream computing application. Each node 150 includes a network interface 115, processor 120, and memory 125 with processing element 155 and operator 160. The computing resources of a node 150 may be provided by a single computing system, or a node may be a composite of multiple computing systems. Nodes 150 may include internal and external hardware components, as depicted and described in further detail with respect to FIG. 4.

Each node 150 may include one or more processing elements 155 that may each, in turn, contain one or more operators 160. Thus, computing environment 100 may include several nodes 150, processing elements 155, and operators 160 upon which an application may be distributed. The number of nodes 150, processing elements 155, and operators 160 may depend on several factors, such as the computing requirements of a given application. In some embodiments, each processing element 155 is a Linux process and each operator is an IBM Streams operator. An operator 160 may receive a stream of tuples as input, perform some action on the stream (e.g., filtering, aggregation, analytics, etc.), and output the resulting stream to the next operator 160.

Server 110 may include network interface 115, processor 120, memory 125 with monitoring module 130 and adjustment module 135, and storage 140. In general, server 110 may monitor and adjust the distribution of a stream computing application's workload with monitoring module 130 and adjustment module 135. In various embodiments of the present invention, server 110 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 110 may include internal and external hardware components, as depicted and described in further detail with respect to FIG. 4.

Monitoring module 130 and adjustment module 135 may include one or more modules or units to perform various functions of present invention embodiments described below. Monitoring module 130 and adjustment module 135 may be implemented by any combination of any quantity of software and/or hardware modules or units, and may reside within memory 125 of server 110 for execution by a processor, such as processor 120.

Monitoring module 130 may monitor the execution of a distributed computing application in computing environment 100. In particular, monitoring module 130 may track the consumption of computing resources, such as processing, memory, and network resource consumption, for each operator 160 and processing element 155, as well as for the distributed application as a whole. Monitoring module 130 may record an application's resource usage to storage 140 to provide a history of the application's resource utilization. Additionally, monitoring module 130 may monitor and record the distribution of an application's workload, including which processing elements 155 and nodes 150 are hosting particular operators 160, and which functions are parallelized. Monitoring module 130 may identify processing elements 155 and operators 160 that exceed predetermined thresholds of resource consumption. For example, monitoring module 130 may identify operators 160 that are overutilizing or underutilizing the computing resources of a processing element 155. Similarly, monitoring module 130 may identify processing elements 155 that are overutilizing or underutilizing the computing resources of a node 150.

Adjustment module 135 may modify the distribution of an application's workload by changing the configuration of nodes 150, processing elements 155, and operators 160. An operator may be unfused (i.e., removed) from its processing element, and fused (i.e., added) to another processing element. For example, an operator may be fused to a processing element that has more available computing resources, or can support a particular function that the operator requires. In some embodiments, adjustment module 135 may fuse and unfuse operators from processing elements while an application is executing (i.e. at runtime). Adjustment module 135 may unfuse an operator from a first processing element and fuse the operator into a second processing element by terminating the execution of the operator in the first processing element and initiating execution of the operator in the second processing element. Adjustment module 135 may make adjustments to the application at runtime such that the application may continue running without being substantially impacted; for example, a speech-to-text application rarely transcodes in real-time so it may be acceptable for one or two sentences to be delayed such that they come through at the same time, before resuming the normal rate of flow. If an adjustment would critically impact an application, the portion of the application impacted may be temporarily parallelized in order to maintain operation while adjustment module 135 modifies the distribution of the application's workload at runtime. When an operator is fused to a new processing element, adjustment module 135 may redirect its input and output streams accordingly.

In some embodiments, adjustment module 135 selects additional nodes to provision to an application. For example, adjustment module 135 may add a node to an application so that a processing element and its operators can be added to the node. Adjustment module 135 may also replace a node with a different node. Adjustment module 135 may launch a new processing element and then fuse an operator to the new processing element.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data on storage 140 may conform to any suitable storage architecture known in the art, such as a file, a relational database, an object-oriented database, and/or one or more tables. Storage 140 may store program instructions for one or more distributed computing applications, instructions for how to determine and carry out adjustments to the workload of a distributed computing application, and metrics regarding the execution and performance of applications in computing environment 100, such as any metrics logged by monitoring module 130.

Network 145 may include, for example, a local area network (LAN), a wide area network (WAN) such as the Internet, or a combination of the two, and may include wired, wireless, or fiber optic connections. In general, network 145 can be any combination of connections and protocols that will support communications between server 110 and nodes 150 (via their respective network interfaces 115) in accordance with an embodiment of the present invention.

Figure 2:
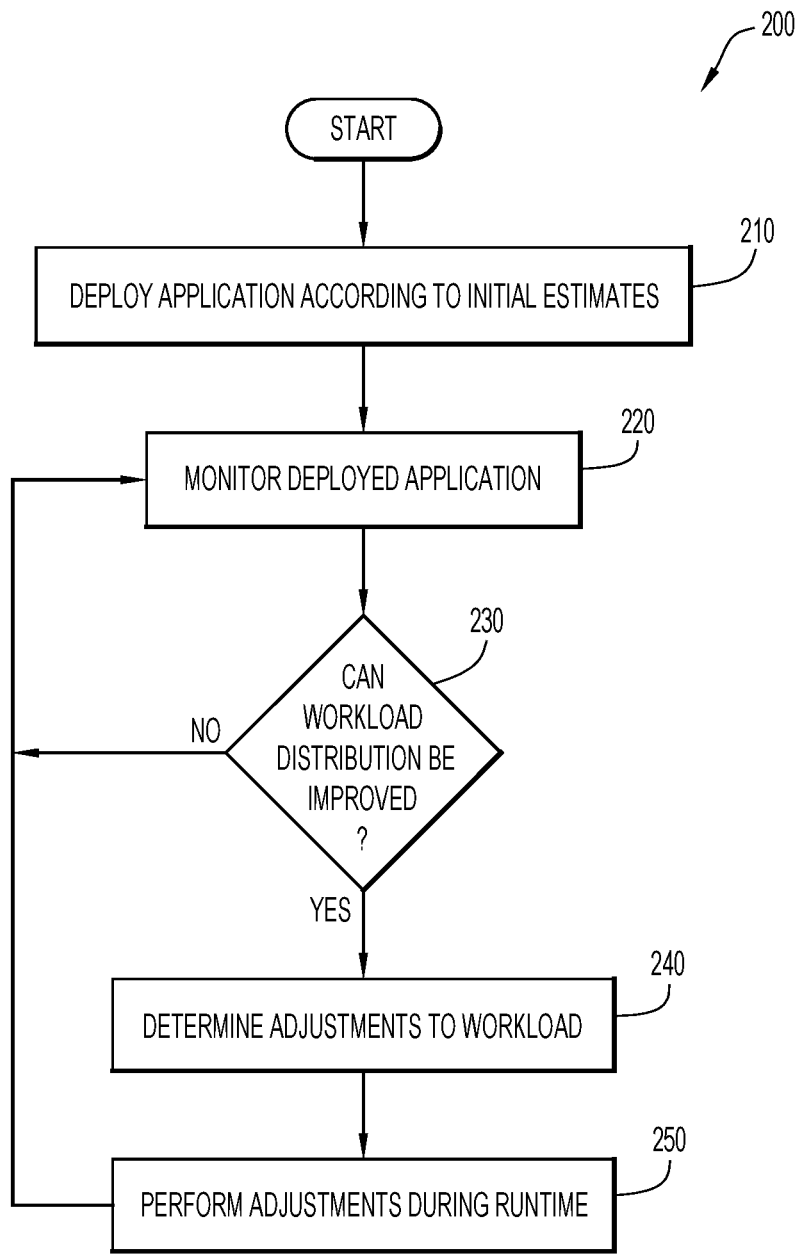
FIG. 2 is a flow chart depicting a method of dynamically balancing an application's workload at runtime in accordance with an embodiment of the present invention.

FIG. 2 is a flow chart depicting a method 200 of dynamically balancing an application's workload at runtime in accordance with an embodiment of the present invention.

An application is deployed according to initial estimates at operation 210. The initial estimates may include any computing resource consumption estimates, such as the amount of processing, memory, and network resources the application will likely require. For example, if an application is intended to process a certain amount of data per second, then the bandwidth requirements of the application can be estimated, and the application will accordingly be provided with nodes 150 that can meet (or surpass) the bandwidth requirements. Estimates of an application's potential to develop back pressure at particular operators may also be considered. Back pressure refers to the queueing of data at the input of an operator, and may indicate that an operator is overloaded and thus causing a bottleneck. Operators that are estimated to potentially develop high back pressure may be hosted by processing elements that can meet the operator's computing resource demands during peak loads.

Another factor considered when calculating the initial estimates for an application is the agreed-upon quality of service (QoS) and service-level agreement (SLA) between the provider and the customer whose application is being deployed. For example, a customer may stipulate that an application should be provided with computing resources that can provide 100%, 150%, or 200% of an application's average computing resource requirements. Such provisions may also be time-dependent; for example, the tiers of a customer's service-level agreement may change depending on the time of day, as certain operations may be more expensive during peak hours.

The elasticity of the deployed application may be considered when estimating the application's requirements. For example, some applications may have the ability to add threads or parallelize certain operations in response to changing conditions, which can impact an application's maximum resource utilization. Other factors that are considered when first deploying an application may include differences in resource requirements arising from the particular containerization manager that will be employed, such as IBM® Platform Symphony, Yarn, Apache Mesos, Docker, LXC, and the like. Additionally, externally-loaded third party resources may impact the computing resources that will be required by an application. For example, if an application will be fetching data from a particular third-party server or database, the application can be distributed onto nodes that can maintain high-throughput, low-latency connections to the third-party server or database. In some embodiments, monitoring module 130 calculates the initial estimates for an application.

The deployed application is monitored at operation 220. Monitoring module 130 may monitor and log an application's performance over time. In particular, monitoring module 130 may monitor an application's consumption of computing resources such as processing resources, memory resources, and network resources. Monitoring module 130 may identify events that lead to changes in an application's resource consumption. For example, monitoring module 130 may determine that when a particular operator is overloaded, the operator's workload is parallelized, causing an increase in processing resource requirements. Monitoring module 130 may also identify repeatable patterns in an application's performance that occur over time.

Operations 230 determines whether the distribution of the application's workload can be improved. Monitoring module 130 may determine that some of the initial estimates regarding an application are not accurately reflected in the application's actual execution history. Monitoring module 130 may determine that the distribution of an application's workload can be improved in response to the application's actual resource consumption deviating from the initial estimates by a particular amount. In some embodiments, when an application's consumption of particular computing resources violates a predetermined threshold, it may be determined that the workload's distribution can be improved. If it is determined that the distribution of an application's workload can be improved, method 200 proceeds to operation 240.

Adjustments that can balance the application's workload are determined at operation 240. If monitoring module 130 determines that an application's workload is not balanced across processing elements and nodes, then monitoring module 130 may determine that fusing certain operators into different processing elements may better balance the load. For example, if one processing element hosts two operators, and the processing element's entire processing capability is regularly consumed by the two operators causing a bottleneck, then monitoring module 130 may determine that unfusing one of the operators and fusing it into an under-utilized processing element may better balance the application's workload, thus eliminating the bottleneck.

If a particular processing element cannot adequately meet the resource demands of a processing element, then the distribution of the workload may be improved by provisioning a different node that can satisfy the demands of the processing element. The processing element and any hosted operators may then be migrated to the new node, and the former node may be repurposed or removed from the distributed computing environment.

An application's workload distribution may be improved by reducing or eliminating the network congestion. For example, if a first operator outputs data to a second operator, and the network path is congested, then the second operator can be co-located to the same resource (e.g., node or processing element) as the first operator. Network congestion may be indicated by a reduction in throughput in a connection between operators and/or an increase in latency between operators. When two operators are co-located on the same resource, data may be shared between them without having to exit the resource's memory space, thus eliminating the need to consume network resources to share data.

If monitoring module 130 determines that an operator's tuple throughput is low, it may indicate that the operator is struggling to perform a particular operation. The workload can be balanced by parallelizing the task performed by the operator. For example, a second operator can be added to the distributed application in a location parallel to the operator having low throughput, and the computational task that was previously performed by a single operator can now be shared by two operators.

The adjustments to the workload are performed at operation 250. One or more workload-balancing adjustments may be made to an application at runtime, enabling the application's workload distribution to be optimized without having to shut down or restart the application. The adjustments to a workload may include adding new resources, such as nodes or processing elements, to a distributed computing environment, fusing operators into different processing elements, and parallelizing certain tasks. The adjustments may be performed by adjustment module 135. Once the workload adjustments are performed, method 200 may return to operation 220 and monitoring module 130 may continue to monitor the application. Thus, a distributed application may be continuously and dynamically adjusted during runtime to constantly adapt to any changes in the application's computing resource requirements.

Figure 3A:
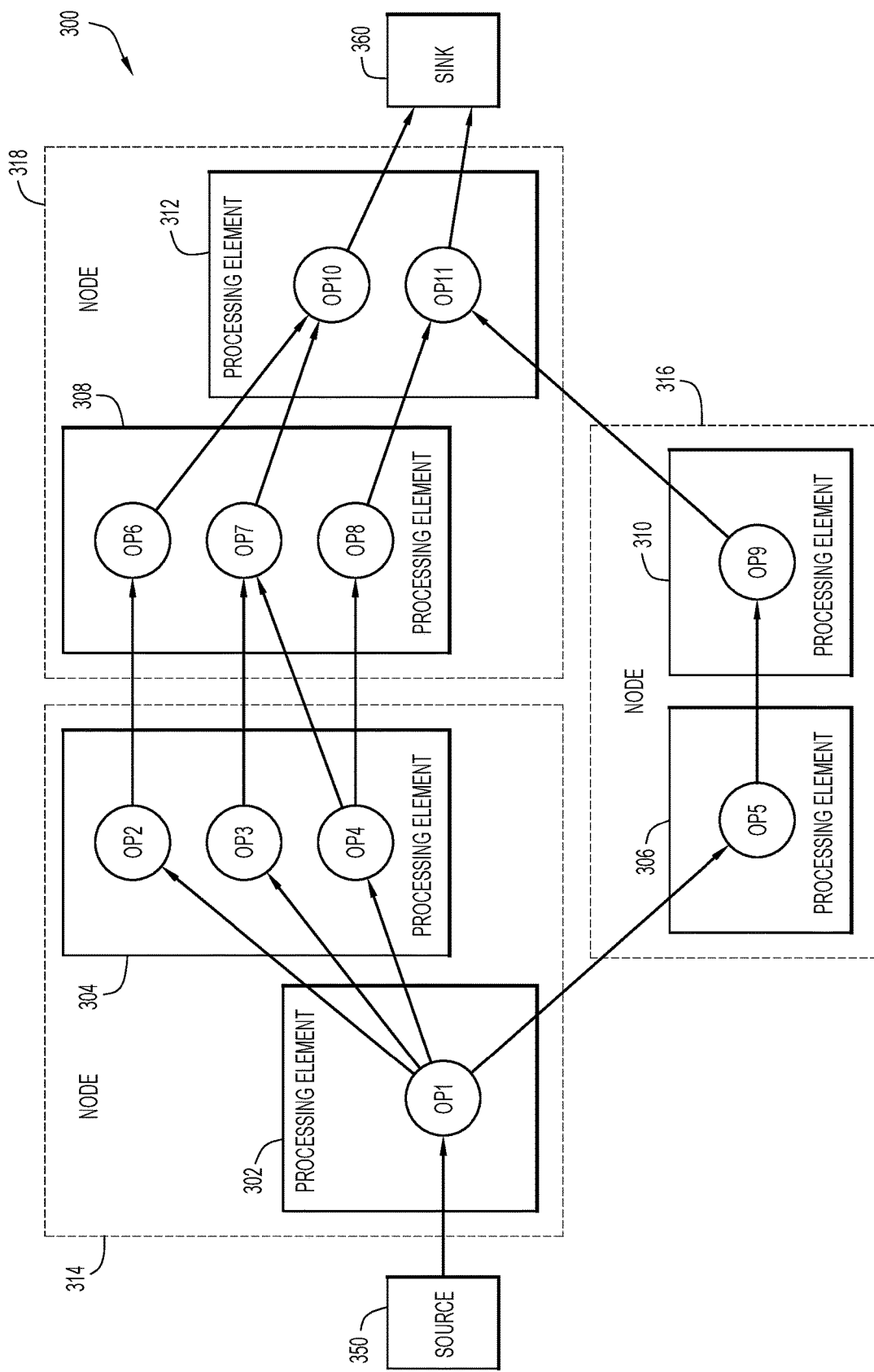
FIG. 3A illustrates an example of an operator graph of a workload's distribution before balancing in accordance with an embodiment of the present invention.

FIG. 3A illustrates an example of an operator graph 300 of a workload's distribution before balancing in accordance with an embodiment of the present invention. As depicted, operator graph 300 includes a source 350, nodes 314, 316, and 318, processing elements 302, 304, 306, 308, 310, and 312, operators OP1-OP11, and sink 360. Generally, a stream of data flows from source 350 and is passed from operator to operator, which each perform some action on the stream, until the stream is output to sink 360.

Node 314 hosts processing elements 302 and 304, node 316 hosts processing elements 306 and 310, and node 318 hosts processing elements 308 and 312. Processing element 302 has a single operator, OP1; similarly, processing element 306 hosts operator OP5 and processing element 310 hosts operator OP9. Processing element 304 hosts operators OP2, OP3, and OP4, and processing element 308 hosts operators OP6, OP7, and OP8. Processing element 312 hosts two operators, OP10 and OP12. Arrows indicate the flow of the stream from operator to operator as the stream splits and merges.

Figure 3B:
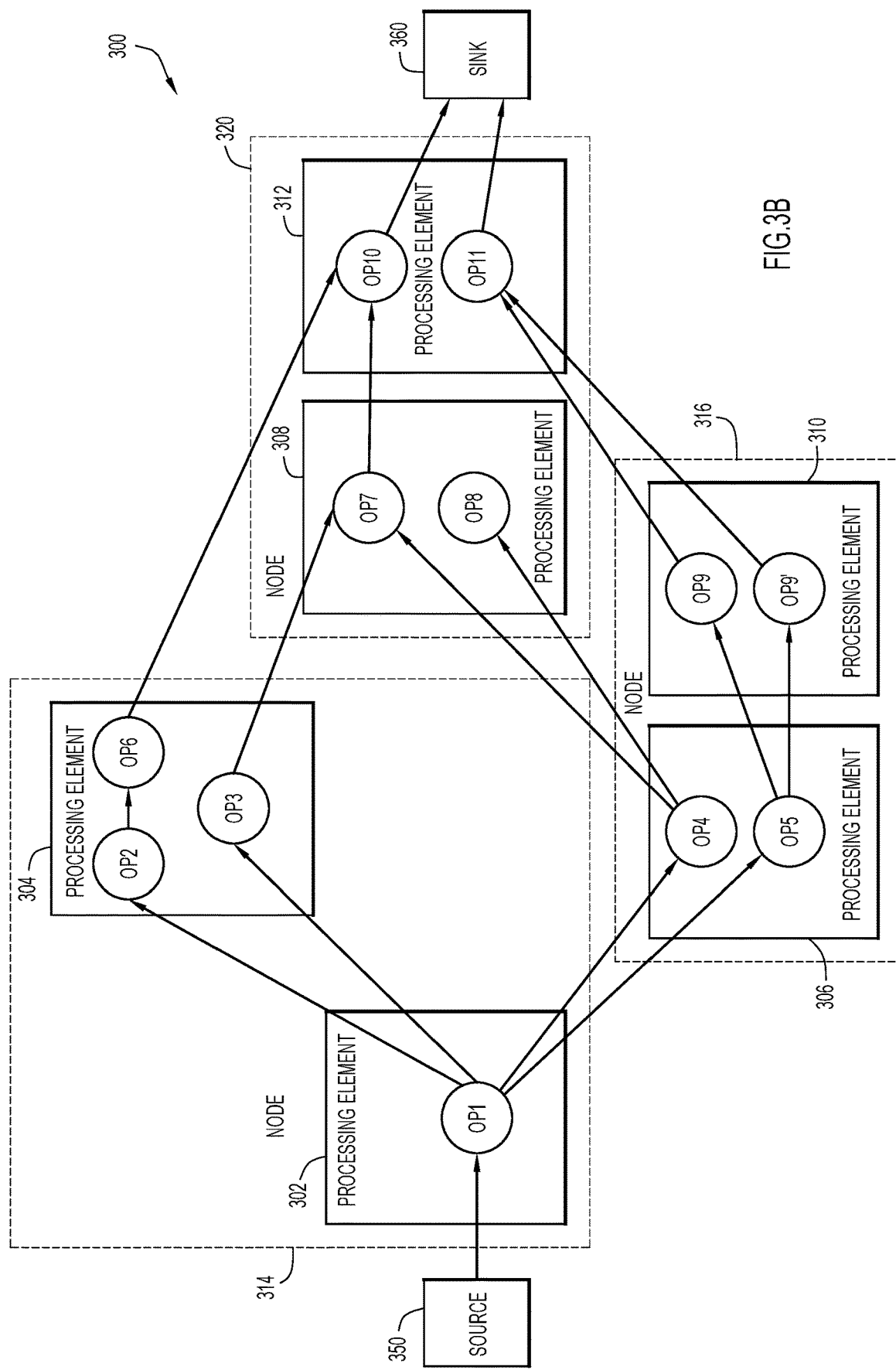
FIG. 3B illustrates an example of an operator graph of a workload's distribution after balancing in accordance with an embodiment of the present invention.

FIG. 3B illustrates an example of an operator graph 300 of a workload's distribution after balancing in accordance with an embodiment of the present invention. The balancing operation has replaced node 318 with node 320, has added another operator, OP9', to the computing environment, and has moved operators OP4 and OP6 to other processing elements. As depicted, operator graph 300 includes a source 350, nodes 314, 316, and 320, processing elements 302, 304, 306, 308, 310, and 312, operators OP1-OP11 (including both OP9 and OP9'), and sink 360.

Because of the adjustment to the workload, some of the operators have been unfused from their original processing elements and fused to another processing element. In this example, operator OP4 has been unfused from processing element 304 and fused into processing element 306. Monitoring module 130 may have determined that processing element 304 was struggling to provide all three of its operators, OP2, OP3, and OP4, with an adequate amount of processing power, and that processing element 304 would benefit from unfusing one of its operators and fusing it into another processing element. Monitoring module 130 may determine that node 316 has enough available resources to assume the workload of operator OP4, so operator OP4 has been fused into processing element 306.

Balancing a workload may also involve the addition or replacement of certain nodes to an application. Monitoring module 130 may determine that node 318 does not have enough of one or more computing resources to adequately serve processing elements 308 and 312. Thus, a new node, node 320, may be added, and processing elements 308 and 312, along with their hosted operators, may be migrated to node 320 by adjustment module 135. Once the processing elements and operators are migrated to new node 320, adjustment module 135 may remove node 318.

In the case of network congestion, operators may be co-located so that they can share data without having to consume any network resources. In this example, monitoring module 130 may determine that there is network congestion between operators OP2 and OP6. Thus, adjustment module 135 may unfuse operator OP6 from processing element 308 and fuse operator OP6 into processing element 304, so that data can flow from operator OP2 to OP6 without exiting the memory of processing element 304.

In response to determining that an operator's tuple throughput is low, the computational task performed by operator may be parallelized. Monitoring module 130 may determine that operator OP9 is experiencing low throughput. For example, operator OP9 may be outputting fewer tuples than it should be, and/or there may be back pressure at operator OP9. In response, adjustment module 135 may add another operator, operator OP9', to the distributed application. Operators OP9 and OP9' both receive data from operator OP5, perform a parallelized action on the data, and output the results to operator OP11.

Figure 4:
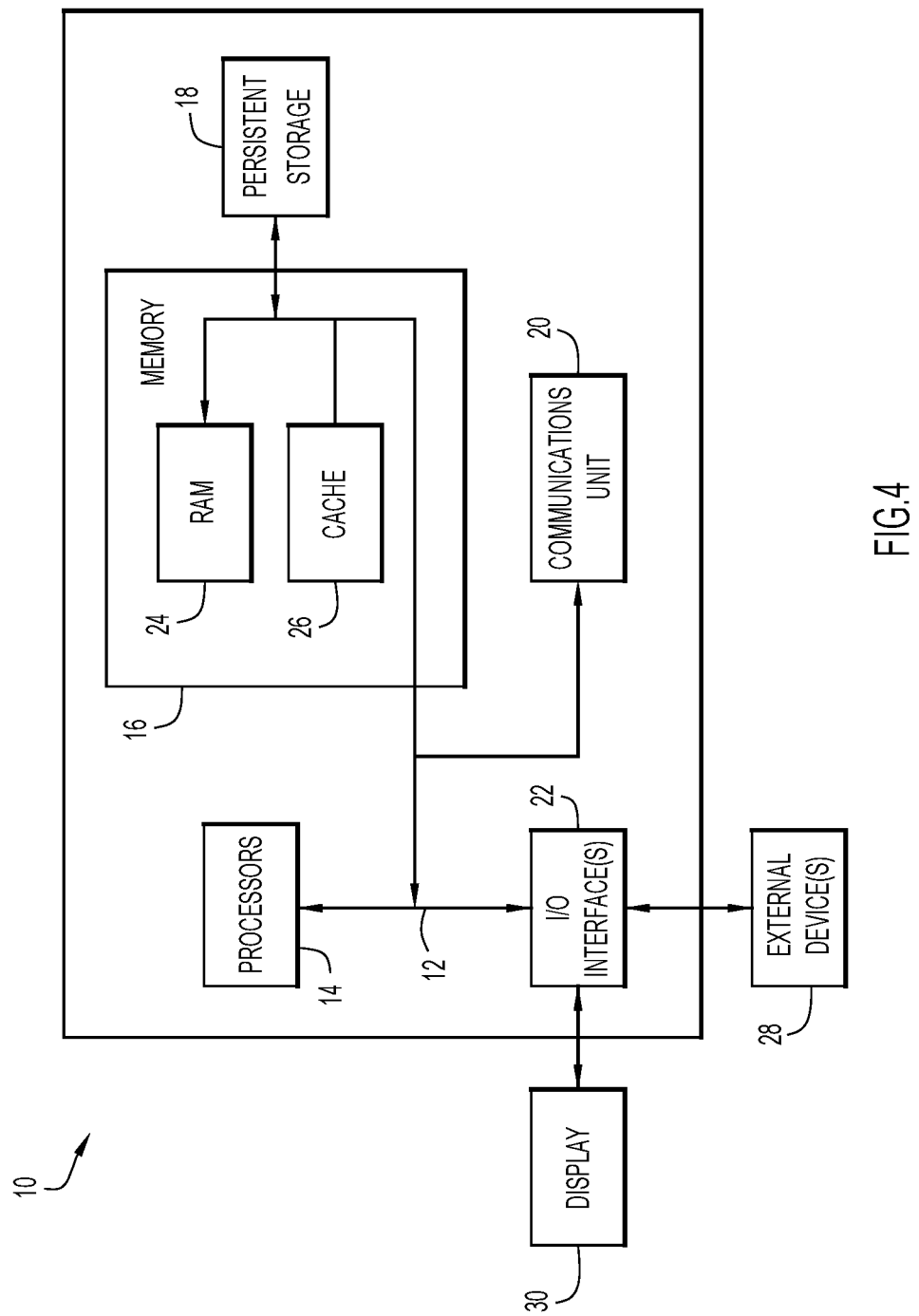
FIG. 4 is a block diagram depicting a computing device in accordance with an embodiment of the present invention.

FIG. 4 is a block diagram depicting components of a computer 10 suitable for executing the methods disclosed herein. Computer 10 may enable server 110 and nodes 150 to dynamically balance the workload of a distributed computing application at runtime in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to distributed computing application may be stored within any conventional or other data structures (e.g., files, arrays, lists, stacks, queues, records, etc.) and may be stored in any desired storage unit (e.g., database, data or other repositories, queue, etc.). The data transmitted between server 110 and nodes 150 may include any desired format and arrangement, and may include any quantity of any types of fields of any size to store the data. The definition and data model for any data relating to a distributed computing application may indicate the overall structure in any desired fashion (e.g., computer-related languages, graphical representation, listing, etc.).

Data relating to a distributed computing application, such as data in a computing stream, program instructions for a distributed computing application, program instructions for how to balance the workload of a distributed computing application, or metadata corresponding to a distributed computing application, may include any information provided to server 110 or node 150. Data relating to a distributed computing application or workload balancing operation may include any desired format and arrangement, and may include any quantity of any types of fields of any size to store any desired data. The fields may indicate the presence, absence, actual values, or any other desired characteristics of the data of interest (e.g., quantity, value ranges, etc.). Data relating to a distributed computing application or workload balancing operation may include all or any desired portion (e.g., any quantity of specific fields) of any data of interest within a given implementation or system. Data relating to distributed computing application or workload balancing operation may indicate the overall structure in any desired fashion (e.g., computer-related languages, graphical representation, listing, etc.).

Data that is processed in a distributed computing environment may include any data, such as data that is made available over time, or an amount of data that is available immediately. A distributed computing application may perform any operation on data that it processes. A distributed computing application may include any number of nodes, processing elements, and operators, arranged in parallel and/or in series or any combination thereof. Data may flow through portions a distributed computing application in a forward (e.g., toward a data sink) direction, backward (e.g., toward a data source) direction, in a lateral direction, or any combination thereof.

The present invention embodiments may employ any number of any type of user interface (e.g., Graphical User Interface (GUI), command-line, prompt, etc.) for obtaining or providing information (e.g., data relating to a distributed computing application or workload balancing operation), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for dynamically balancing a workload in a distributed computing environment at runtime.

The environment of the present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., distributed computing software, workload balancing software, communications software, server software, monitoring module 130, adjustment module 135, processing element 155, operator 160, etc.). These systems may include any types of monitors and input devices (e.g., keyboard, mouse, voice recognition, etc.) to enter and/or view information.

It is to be understood that the software (e.g., distributed computing software, workload balancing software, communications software, server software, monitoring module 130, adjustment module 135, processing element 155, operator 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., distributed computing software, workload balancing software, communications software, server software, monitoring module 130, fusion module 135, processing element 155, operator 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., stream computing data, program instructions for a distributed computing application, program instructions for how to balance a workload of a distributed computing application, or metadata corresponding to a distributed computing application or workload balancing operation). The database system may be implemented by any number of any conventional or other databases, data stores or storage structures (e.g., files, databases, data structures, data or other repositories, etc.) to store information (e.g., stream computing data, program instructions for a distributed computing application, program instructions for how to balance a workload of a distributed computing application, or metadata corresponding to a distributed computing application or workload balancing operation). The database system may be included within or coupled to the server and/or client systems. The database systems and/or storage structures may be remote from or local to the computer or other processing systems, and may store any desired data (e.g., stream computing data, program instructions for a distributed computing application, program instructions for how to balance a workload of a distributed computing application, or metadata corresponding to a distributed computing application or workload balancing operation).

The present invention embodiments may employ any number of any type of user interface (e.g., Graphical User Interface (GUI), command-line, prompt, etc.) for obtaining or providing information (e.g., data in a dataset or common data model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of dynamically balancing a workload of a distributed computing application at runtime comprising:
    monitoring a distributed computing application at runtime for occurrence of one or more conditions, wherein the distributed computing application comprises one or more nodes that include one or more processing elements, wherein each processing element includes one or more operators, and wherein the one or more conditions include a computing resource utilization of an identified operator exceeding a corresponding computing resource threshold of a first processing element hosting the identified operator;
    determining one or more adjustments to the distributed computing application, wherein the one or more adjustments include fusing the identified operator into a second processing element to support the computing resource utilization of the operator; and
    performing the one or more adjustments to the distributed computing application at runtime while maintaining execution of the distributed computing application.

2. The computer-implemented method of claim 1, wherein the one or more conditions comprise a computing resource utilization of one or more processing elements exceeding a corresponding computing resource threshold of a node, and wherein the one or more adjustments comprise providing a new node to support the computing resource utilization of the one or more processing elements, and migrating the one or more processing elements to the new node.

3. The computer-implemented method of claim 1, wherein the one or more conditions comprise a network congestion metric of a first and second operator exceeding a corresponding computing threshold, and wherein the one or more adjustments comprise co-locating the first operator with the second operator.

4. The computer-implemented method of claim 1, wherein the one or more conditions comprise a throughput metric of an operator exceeding a corresponding throughput threshold, and wherein the one or more adjustments comprise providing a new operator to the distributed computing application to parallelize computing operations of the operator exceeding the throughput threshold.

5. A computer system for dynamically balancing a workload of a distributed computing application at runtime, the computer system comprising:
one or more computer processors;
one or more computer readable storage media;
program instructions stored on the one or more computer readable storage media for execution by at least one of the one or more computer processors, the program instructions comprising instructions to:
monitor a distributed computing application at runtime for occurrence of one or more conditions, wherein the distributed computing application comprises one or more nodes that include one or more processing elements, wherein each processing element includes one or more operators, and wherein the one or more conditions include a computing resource utilization of an identified operator exceeding a corresponding computing resource threshold of a first processing element hosting the identified operator;
determine one or more adjustments to the distributed computing application, wherein the one or more adjustments include fusing the identified operator into a second processing element to support the computing resource utilization of the operator; and
perform the one or more adjustments to the distributed computing application at runtime while maintaining execution of the distributed computing application.

6. The computer system of claim 5, wherein the one or more conditions comprise a computing resource utilization of one or more processing elements exceeding a corresponding computing resource threshold of a node, and wherein the one or more adjustments comprise providing a new node to support the computing resource utilization of the one or more processing elements, and migrating the one or more processing elements to the new node.

7. The computer system of claim 5, wherein the one or more conditions comprise a network congestion metric of a first and second operator exceeding a corresponding computing threshold, and wherein the one or more adjustments comprise co-locating the first operator with the second operator.

8. The computer system of claim 5, wherein the one or more conditions comprise a throughput metric of an operator exceeding a corresponding throughput threshold, and wherein the one or more adjustments comprise providing a new operator to the distributed computing application to parallelize computing operations of the operator exceeding the throughput threshold.

9. A computer program product for dynamically balancing a workload of a distributed computing application at runtime, the computer program product comprising one or more computer-readable storage media collectively having program instructions embodied therewith, the program instructions executable by a computer to cause the computer to:
monitor a distributed computing application at runtime for occurrence of one or more conditions, wherein the distributed computing application comprises one or more nodes that include one or more processing elements, wherein each processing element includes one or more operators, and wherein the one or more conditions include a computing resource utilization of an identified operator exceeding a corresponding computing resource threshold of a first processing element hosting the identified operator;
determine one or more adjustments to the distributed computing application, wherein the one or more adjustments include fusing the identified operator into a second processing element to support the computing resource utilization of the operator; and
perform the one or more adjustments to the distributed computing application at runtime while maintaining execution of the distributed computing application.

10. The computer program product of claim 9, wherein the one or more conditions comprise a computing resource utilization of one or more processing elements exceeding a corresponding computing resource threshold of a node, and wherein the one or more adjustments comprise providing a new node to support the computing resource utilization of the one or more processing elements, and migrating the one or more processing elements to the new node.

11. The computer program product of claim 9, wherein the one or more conditions comprise a network congestion metric of a first and second operator exceeding a corresponding computing threshold, and wherein the one or more adjustments comprise co-locating the first operator with the second operator.

12. The computer program product of claim 9, wherein the one or more conditions comprise a throughput metric of an operator exceeding a corresponding throughput threshold, and wherein the one or more adjustments comprise providing a new operator to the distributed computing application to parallelize computing operations of the operator exceeding the throughput threshold.

* * * * *